United States Patent [19]

Stark, Jr.

[11] 4,307,212

[45] Dec. 22, 1981

[54] CURABLE EPOXY RESINS

[75] Inventor: Charles J. Stark, Jr., Clifton Park, N.Y.

[73] Assignee: General Electric Company, Schenectady, N.Y.

[21] Appl. No.: 178,073

[22] Filed: Aug. 14, 1980

[51] Int. Cl.³ .............................................. C08G 59/68
[52] U.S. Cl. ................................... 525/507; 525/523; 528/88; 528/92; 528/361; 528/411
[58] Field of Search ................ 525/507, 523; 528/88, 528/92, 361, 411

[56] References Cited

U.S. PATENT DOCUMENTS

| | | | |
|---|---|---|---|
| 2,962,410 | 11/1960 | Kohn et al. | 528/92 X |
| 3,776,978 | 12/1973 | Markovitz | 528/92 X |
| 3,812,214 | 5/1974 | Markovitz | 528/92 |
| 4,116,886 | 9/1978 | Cella | 528/88 |

*Primary Examiner*—Earl A. Nielsen
*Attorney, Agent, or Firm*—Peter A. Bielinski; James C. Davis, Jr.; Joseph T. Cohen

[57] ABSTRACT

Curable epoxy resin compositions which exhibit controllable cure rates are described which utilize catechol derived accelerators in combination with certain curing agents. These accelerators can be employed in single package curable epoxy resin compositions useful in molding and casting applications.

29 Claims, No Drawings

CURABLE EPOXY RESINS

This invention is concerned with novel, heat-curable, thermosetting epoxy resin compositions having a cure rate which can be varied over a broad temperature range utilizing a cure accelerator derived from the silylation of catechol and its derivatives. More particularly, the invention relates to a composition of matter comprising an epoxy resin, a curing agent, and an accelerator of the general formula

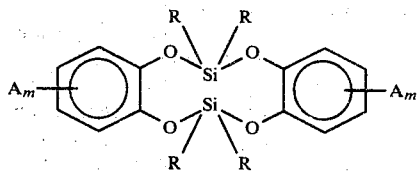

where R is independently selected from the class consisting of hydrogen, monovalent alkyl (including aralkyl) groups of from 1 to 8 carbon atoms (e.g., methyl, ethyl, benzyl, propyl, isopropyl, hexyl, 2-ethylhexyl, etc.); aryl (e.g., phenyl, naphthyl, etc.); alkaryl (e.g., tolyl, etc.); vinyl, and allyl radicals, and A is independently selected from alkyl radicals the same as R above, alkoxy groups having 1 to 6 carbon atoms; halogen (e.g., chlorine, bromine, etc.) and the nitro radical, where A can be ortho-, meta-, or para- to any of the oxygen atoms attached to silicon, and m is an integer from 0 to 2 inclusive, with the proviso that at most only one hydrogen can be on any one silicon atom.

The cure accelerators corresponding to formula I, may be prepared by reacting, in the presence of an inert solvent, such as toluene or benzene, a catechol of the general formula:

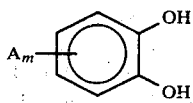

with a dihalogenosilane of the formula $X_2\text{-Si-}R_2$  III where X is a halogen radical, e.g., chlorine, bromine, etc., and R, A, and m have the meanings above. More specifically, the compound of formula I, is the reaction product of essentially 1 molar equivalent of the catechol compound of formula II with essentially 1 molar equivalent of a dihalogenosilane of formula III where any hydrohalide formed is removed.

Analysis of the accelerator compositions thus formed was accomplished by $^{29}Si$ NMR and $^{13}C$ NMR techniques, confirming the predominant presence of a compound corresponding to formula I. Field desorption mass spectrometry further established the presence of small amounts (less than 10 total percent) of compounds having the following structural formulas:

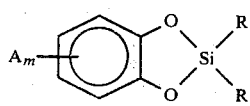

and

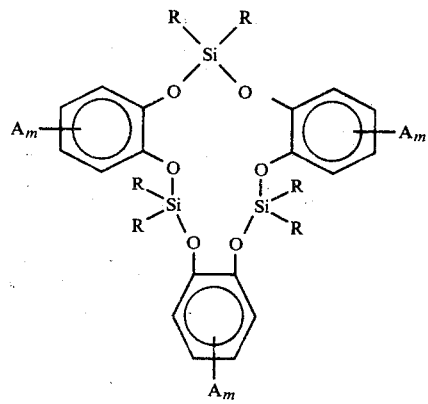

where R, A, and m have the meanings above. In addition, vapor phase chromatography demonstrated the absence of catechol. Compounds of formula I, prepared as described above, demonstrated a tendency to rearrange either at ambient or elevated temperatures to form compounds of formula V as shown by field desorption mass spectrometry and also dissociates to form compounds of formula IV, as disclosed in Chemical Abstracts, Volumn 83 at 205342Y (1975) and more specifically in "Z. Naturforsch, 30b, 488–490 [1975]; Eingegangen am 24, März 1975." However, as previously stated, the compounds corresponding to formulas IV and V, are generally present in amounts less than 10 percent total and do not adversely affect the acceleration rate for the compound of formula I in the cure of the epoxy resins.

Examples of the dihalogenosilanes which may be used in the preparation of the cure accelerators used in the instant invention include, e.g., allylmethyldichlorosilane, dimethyldibromosilane, n-amylmethyldichlorosilane, t-butylphenyldichlorosilane, t-butylmethyldichlorosilane, 2-carbomethoxyethylmethyldichlorosilane, cyclopentylmethyldichlorosilane, diallyldichlorosilane, dimethyldichlorosilane, diphenyldichlorosilane, ethyldichlorosilane, ethylmethyldichlorosilane, phenylallyldichlorosilane, phenyldichlorosilane methyl phenyldichlorosilane, methyldichlorosilane, etc.

Epoxy resin compositions, heretofore have been utilized for example, as electrical insulation for electrical conductors. The cure rate of the epoxy resins has previously been of prolonged duration, e.g., often as long as 10 to 15 hours at 160°, especially in casting applications, significantly delaying utilization of said epoxy resins in a broad range of applications.

It is an object of the present invention to provide a thermosetting epoxy resin composition, the reactivity of which can be controlled over a very wide range having an ability to cure rapidly at elevated temperatures, which are often lower than usually required.

It is an additional object of this invention to provide epoxy resin compositions containing cure accelerators which impart desirable physical properties, including favorable chemical and electrical properties in the resultant heat-cured epoxy resin.

The term "epoxy resins" is intended to include those selected from both glycidyl and non-glycidyl ether epoxides containing more than one 1,2-epoxy groups per molecule.

Such non-glycidyl ether cycloaliphatic epoxides are characterized by the absence of the ether oxygen bond, i.e., —O—, near the epoxide group, and are selected from those which contain a ring structure as well as more than one epoxide group in the molecule. The epoxide group may be part of the ring structure or may be attached to the ring structure. These epoxides may also contain ester linkages. These ester linkages are generally not near the epoxide group and are relatively unreactive, therefore these type materials are properly characterized as cycloaliphatic epoxides. These epoxides are generally prepared by epoxidizing unsaturated aliphatic hydrocarbon compounds, such as cyclic-olefins, using hydrogen peroxide or peracids such as peracetic acid and perbenzoic acid.

Other epoxy resins which may be employed in this invention such as 1,2-epoxy resins having more than one epoxy group per molecule include cycloaliphatic epoxy resins such as 3,4-epoxycyclohexylmethyl- (3,4-epoxy) cyclohexane carboxylate (sold under the trademarks ERL 4221 by Union Carbide Co. or Araldite CY 179 by Ciba Products Company), bis(3,4-epoxy 6-methylcyclohexylmethyl) adipate (sold under the trademarks ERL 4289 by Union Carbide Co. or Araldite CY 178 by Ciba Products Company), bis(2,3-epoxycyclopentyl) ether resins (sold under the trademark ERL 4205 by Union Carbide Company), 2-(3,4-epoxy)-cyclohexyl-5, and 5-spiro (3,4-epoxy)-cyclohexane-m-dioxane. (sold under the trademark Araldite CY 175 by Ciba Products Company), etc.

Glycidyl ether based epoxy resins suitable for use according to the present invention include glycidyl ethers of phenolic epoxy resins such as liquid or solid bisphenol-A diglycidyl ether epoxy resins (such as those sold under trademarks as Epon 826, Epon 828, Epon 830, Epon 1001, Epon 1002, Epon 1004, etc., by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under trademarks ECN 1235, ECN 1273, ECN 1280 and ECN 1299 by Ciba Products Company), resorcinol glycidyl ethers (such as ERE 1359 made by Ciba Products Company), tetra-glycidyl tetraphenylethane (Epon 1031, made by Shell Chemical Company); glycidyl ether epoxy resins such as diglycidyl phthalate (ED-5661 by Celanese Resins Company), diglycidyl tetrahydrophthalate (Araldite CY 182 by Ciba Products Company), and diglycidyl hexahydrophthalate (Araldite CY 183 made by Ciba Products Company); and flame retardant epoxy resins such as halogen-containing bisphenol-A diglycidyl ether epoxy resins (e.g., DER 542 and DER 511 which have bromine contents of 44–48 and 18–20%, respectively, and are made by Dow Chemical Company).

The foregoing epoxy resins are well known in the art and are set forth, for example, in many patents including U.S. Pat. Nos. 2,324,483, 2,444,333, 2,494,295, 2,500,600, and 2,511,913. The curing agents used in the practice of this invention are not only effective with various epoxy resins and mixtures of epoxy resins, but they are also effective in mixtures containing reactive and nonreactive epoxy diluents (or extenders), epoxy flexibilizers and fillers.

There are many epoxy resin curing agents in use. Among the most common are the aromatic polyamines, aliphatic polyamines and their adducts, carboxylic acid anhydrides, polyamines and catalytic curing agents, as, for example, tertiary amines, imidazoles, $BF_3$ monoethylamine, and dicyanodiamide.

In addition, there are metal acetylacetonates in which the metal is aluminum, barium, beryllium, cadmium, calcium, cerous, chromic, cobaltic, cobaltous, cupric, ferric, ferrous, lead lithium, magnesium, manganic, molybdenum, nickel, potassium titanium, zinc, zirconium, etc.

Phenolic cure accelerators are frequently used in conjunction with an initiator in the curing of epoxy resins. Among the more common accelerators are bisphenol-A (i.e., 2,2-bis(4-hydroxyphenyl) propane, catechol, resorcinol, and hydroquinone. Other phenolic accelerators include halogenated phenols such as ortho-, meta-, and parachlorophenols or bromophenols.

The curing rate of epoxy resin compositions of the present invention can be tailored to cure over a time span of from about one minute to several hours based on the resin or resin mixture selected, and the type of curing agent, the amount and type of accelerator utilized in relation to the cure temperature chosen, etc. Further, blends of epoxy resins such as ERL 4221 epoxy resin/ECN 1235 epoxy cresol novolac resin, or glycidyl ether and glycidyl ester pepoxy resins may be cured using the accelerators of general formula I.

The curable epoxy resin compositions comprising a suitable epoxy resin or epoxy resin mixture, a titanate or zirconate curing agent and an accelerator corresponding to formula I can be heat cured at a temperature of from 75° C. to 200° C., and advantageously cured at a temperature of from 100° C. to 175° C., to obtain the heat cured product.

The composite heat curable epoxy resins of the present invention are available as a one-component, ready to use package not requiring the blending of ingredients immediately prior to utilization. The epoxy resin compositions generally consist of a mixture of a resin, an organic titanate or zirconate cure initiator or curing agent and an accelerator of formula I.

Some of the applications in which the curable compositions of the present invention can be used, are, for example protective coatings, liquid injection molding compounds, wire insulation, encapsulation of electronic components, laminates, bulk molding compounds (BMC), e.g., as housings for motors, grills for automobiles, etc.

The organic titanate initiators which are added to the epoxy resin composition to initiate the cure of the epoxy resins include chelated titanates such as acetylacetonate titanate, lactate titanate, triethanolamine titanate, polyhydroxystearate titanate, a glycolate titanate (e.g., tetraoctylene glycol titanate containing approximately 7.8% Ti and sold under the trademark Tyzor OG by E. I. du Pont de Nemours and Company or di-n-butyl hexylene glycol titanate), and nonchelated titanates such as tetraisopropyl titanate (TPT), tetrabutyl titanate, polymerized tetrabutyl titanate, and tetrakis (2-ethylhexyl) titanate (TOT). In general, the chosen titanate should be present in the mixture in a concentration between 0.03 and 15% by weight, based on the weight of the epoxy resin, with optimum cure rates generally being obtained utilizing titanate concentrations between 1 to 10%, by weight, of the epoxy resin. The amount of curing agent used will depend on such factors as type of epoxy resin used, temperature at which cure is to take place type of accelerator used, etc.

In place of organic titanates, organic zirconate curing agents can be used for the curing of the epoxy resins, and these include, for example, zirconium acetylacetonate, zirconium tert-butoxide, zirconium hexafluoroacetylacetonate, zirconium naphthenate (sold by Witco Chemical Company, Incorporated), zirconium propoxide and zirconium isopropoxide (sold by Ventron Corporation), etc.

Such zirconate curing agents can be used in amounts similar to those for the titanate curing agents, that is, the chosen zirconate should be present in a concentration between 1.0 and 15% by weight, based on the weight of the epoxy resin, with a preferred concentration between 1.0 to 10% by weight, of the epoxy resin.

In order that those skilled in the art may better understand how the present invention may be practiced, the following examples are given by way of illustration and not by way of limitation. All parts are by weight unless otherwise indicated.

EXAMPLE 1

An accelerator having the formula

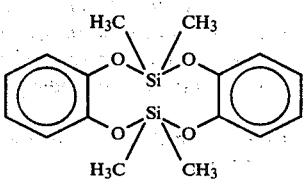
VI.

was prepared following substantially the procedure disclosed in Chemical Abstracts, Volumn 35 at 8677d (1957). In a reaction vessel fitted with a reflux condenser were introduced 132 parts benzene and 0.5 parts activated charcoal. Thereafter, a mixture of 11 parts catechol and 19.4 parts dimethyldichlorosilane was added to the flask with stirring. The mixture was heated to reflux for 15 hours at 80° C. under an atmosphere of nitrogen. When the reaction was completed, the mixture was cooled and the charcoal removed by filtration. The liquid phase was condensed by rotovap and the residue distilled to yield 15.1 parts of the accelerator described above in formula VI.

EXAMPLE 2

A mixture of 100 parts Epon 828, 1.53 parts Tyzor TPT and 4.89 parts of the accelerator of Example 1 was prepared. The gelation time of this thermosetting epoxy resin composition measured with a Sunshine Gel Meter (Sunshine Scientific Instruments Co., Philadelphia, PA.) at 150° C. was 1.3 minutes.

EXAMPLE 3

A mixture of 100 parts Epon 828, 3.37 parts Tyzor OG and 4.89 parts of the accelerator of Example 1 was prepared. The gelation time of this composition measured as above, at 150° C. was 1.2 minutes.

EXAMPLE 4

A thermosetting epoxy resin composition was prepared by mixing 100 parts Epon 828 with 2.63 parts zirconium 2,4-pentanedionate and 4.89 parts of the accelerator of Example 1. The gelation time of this composition, measured as above, at 150° C. was 36.2 minutes.

EXAMPLE 5

A thermosetting epoxy resin composition was prepared by mixing 100 parts Epon 828 with 1.5 parts Tyzor TPT and 4.9 parts of the accelerator of Example 1. The gelation time of this composition, measured as above, at 50° C. was 74.5 minutes.

EXAMPLE 6

A thermosetting epoxy resin composition was prepared by mixing 100 parts Epon 828 with 2.6 parts zirconium 2,4-pentanedionate and 4.9 parts of the accelerator of Example 1. The gelation time of this composition measured as above, at 50° C. was 8529.5 minutes (~6 days.)

EXAMPLE 7

A thermosetting epoxy resin composition was prepared by mixing 100 parts Epon 828 with 2.6 parts zirconium 2,4-pentanedionate and 3 parts catechol. The gelation time of this composition, measured as above, at 50° C. was 2880 minutes (2 days).

EXAMPLE 8

A thermosetting epoxy resin composition was prepared by mixing 100 parts Epon 828, with 1.5 parts Tyzor TPT and 5.2 parts catechol. The gelation time of this composition, measured as above, was 1.9 minutes at 50° C.

EXAMPLE 9

A thermosetting epoxy resin composition was prepared by mixing 100 parts Epon 828, with 1.5 parts Tyzor TPT and 6.2 parts of an accelerator of the formula

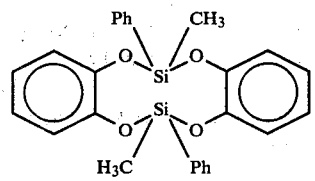
VII.

(prepared similarly as the accelerator of Example 1, by reacting methylphenyldichlorosilane and catechol). The gelation time of this composition, measured as above, at 50° C. was 64 minutes.

EXAMPLE 10

A thermosetting epoxy resin composition was prepared by mixing 100 parts Epon 828, with 3.4 parts Tyzor OG and 6.2 parts of the accelerator of Example 9. The gelation time of this composition, measured as above, at 50° C. was 88 minutes.

EXAMPLE 11

A thermosetting epoxy resin composition was prepared by mixing 100 parts Epon 828, with 3.4 parts Tyzor OG and 6.2 parts catechol. The gelation time of this composition, measured as above, at 50° C. was 9.3 minutes. Comparison of the results of this example with the results in Example 10 shows the ability of our accelerators to stabilize epoxy resins for storage purposes at temperatures as low as 50° C.

EXAMPLE 12

A thermosetting epoxy resin composition was prepared by mixing 100 parts Epon 828 with 3.3 parts Tyzor OG and 8.6 parts of an accelerator having the formula

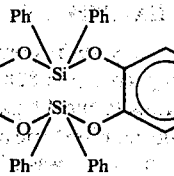
VIII.

(prepared similarly as the accelerator of Example 1, by reacting diphenyldichlorosilane and catechol). The gelation time of this composition measured as above, at 150° C. was 1.8 minutes.

EXAMPLE 13

A thermosetting epoxy resin composition is prepared by mixing 100 parts Epon 828 with 2.63 parts zirconium acetylacetonate and 4.5 parts of an accelerator of the formula

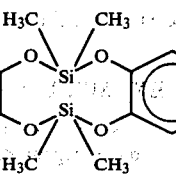
IX.

(prepared similarly as the accelerator of Example 1, by reacting dimethyldichlorosilane and 4-methoxycatechol). When this mixture of ingredients using the accelerator of formula IX is tested as in the preceding examples, it will be found that the storage stability of the uncured material is enhanced and the rate of cure at elevated temperatures is accelerated.

EXAMPLE 14

A thermosetting epoxy resin composition is prepared by mixing 100 parts Epon 828, with 2.6 parts zirconium octylacetonate and 5 parts of an accelerator of the formula

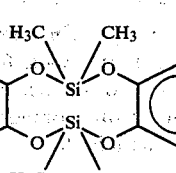
X.

(prepared similarly as the accelerator of Example 1, by reacting dimethyldichlorosilane and 4-isopropylcatechol). When this mixture of ingredients using the accelerator of formula X is tested as in the preceding examples, it will be found that the storage stability of the incurred material is enhanced and the rate of cure at elevated temperatures is accelerated.

EXAMPLE 15

A thermosetting epoxy resin composition is prepared by mixing 100 parts Epon 828 with 3.3 parts Tyzor OG, and 4 parts of an accelerator of the formula

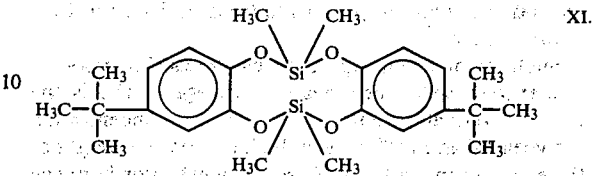
XI.

(prepared similarly as the accelerator of Example 1, by reacting dimethyldichlorosilane with 4-t-butylcatechol). When this mixture of ingredients using the accelerator of formula XI is tested as in the preceding examples, it will be found that the storage stability of the uncured material is enhanced and the rate of cure at elevated temperatures is accelerated.

Although the above examples are directed to only a few of the very many variables included by the curable compositions of the present invention, it should be understood that the curable compositions can comprise a much broader variety of accelerators, initiators, and resins as shown in the description preceding these examples.

What I claim as new and desire to secure by Letters Patent of the United States is:

1. A composition of matter comprising an epoxy resin, a cure initiator, and an accelerator of the general formula

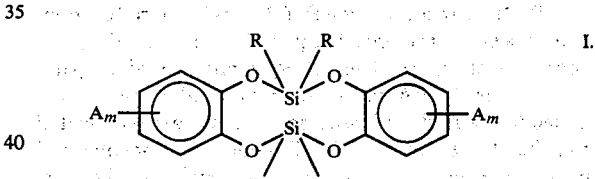
I.

where R is independently selected from the class consisting of hydrogen, monovalent alkyl groups of from 1 to 8 carbon atoms, aryl, alkaryl, vinyl, and allyl radicals; A is independently selected from alkyl radicals the same as R above; alkoxy groups having 1 to 6 carbon atoms; halogen and the nitro radical, where A can be ortho-, meta or para- to any of the oxygen atoms, attached to silicon and m is an integer from 0 to 2, inclusive, with the proviso, that at most only one hydrogen can be on any one silicon atom.

2. A composition of matter as in claim 1, wherein the cure initiator is a titanium or zirconium ester.

3. A composition of matter as in claim 1 wherein the accelerator has the formula

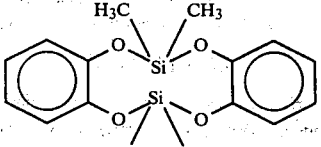

4. A composition of matter as in claim 1 wherein the accelerator has the formula

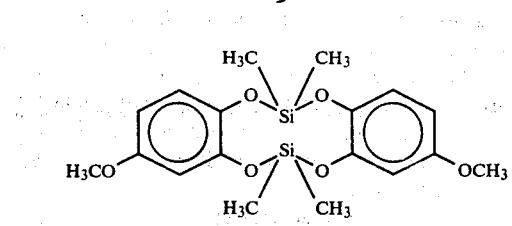

5. A composition of matter as in claim 1 wherein the accelerator has the formula

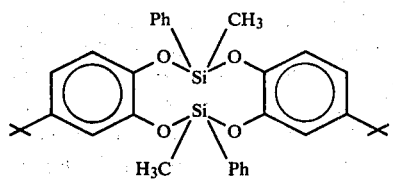

6. A composition of matter as in claim 1 wherein the accelerator has the formula

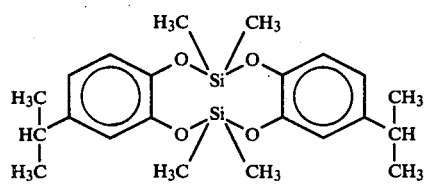

7. A composition of matter as in claim 1 wherein the accelerator has the formula

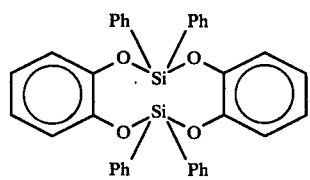

8. A composition of matter as in claim 1 wherein the cure initiator is a zirconium ester and the accelerator has the general formula

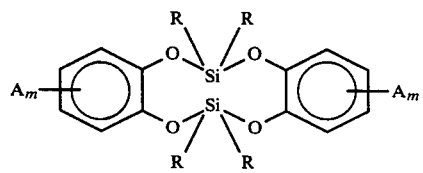

where R is independently selected from the class consisting of from 1 to 8 carbon atoms, aryl, alkaryl, vinyl, and allyl radicals; A is independently selected from alkyl radicals the same as R above; alkoxy groups having 1 to 6 carbon atoms; halogen and the nitro radical, where A can be ortho-, meta-, or para- any of the oxygen atoms attached to silicon, and m is an integer from 0 to 2 inclusive, with the proviso that at most only one hydrogen can be on any one silicon atom.

9. A composition of matter as in claim 1, wherein the cure initiator is a titanium ester and the accelerator has the general formula

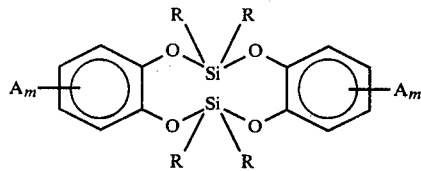

where R is independently selected from the class consisting of hydrogen, monovalent alkyl groups of from 1 to 8 carbon atoms, aryl, alkaryl, vinyl, and allyl radicals; A is independently selected from alkyl radicals the same as R above; alkoxy groups of from 1 to 6 carbon atoms; halogen and the nitro radical, where A can be ortho-, meta- or para- to any of the oxygen atoms attached to silicon, and m is an integer from 0 to 2 inclusive, with the proviso that at most only one hydrogen can be on any one silicon atom.

10. A composition of matter as in claim 9, wherein the accelerator has the formula

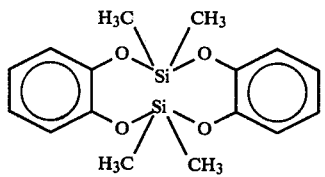

11. A composition of matter as in claim 9, wherein the cure accelerator has the formula

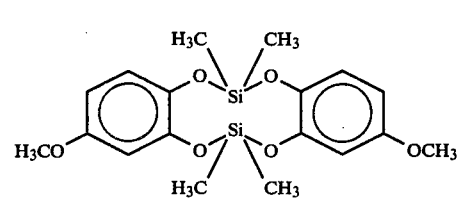

12. A composition of matter as in claim 9, wherein the cure accelerator has the formula

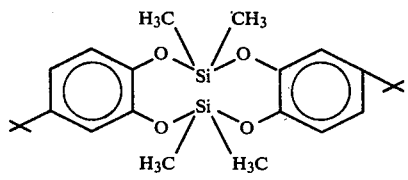

13. A composition of matter as in claim 9, wherein the cure accelerator has the formula

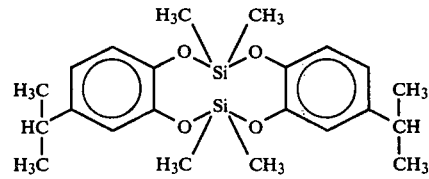

14. A composition of matter as in claim 9, wherein the cure accelerator has the formula

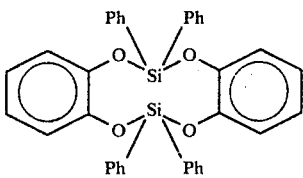

15. A method for curing an epoxy resin which comprises
(1) forming a mixture of ingredients comprising an epoxy resin, a cure initiator, and an accelerator of the general formula

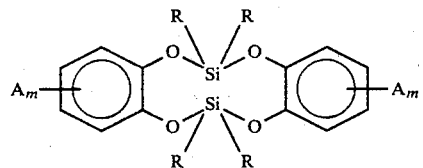

I.

R is independently selected from the class consisting of hydrogen, monovalent alkyl groups of from 1 to 8 carbon atoms; aryl, alkaryl, vinyl, and allyl radicals, A is independently selected from alkyl radicals the same as R above, alkoxy groups of from 1 to 6 carbon atoms; halogen and the nitro radical, where A can be ortho-, meta-, or para- to any of the oxygen atoms attached to silicon, and m is an integer from 0 to 2, inclusive, with the proviso, that at most only one hydrogen can be on any one silicon atom.
(2) heating the aforesaid mixture of ingredients at a temperature and for a time sufficient to effect curing of said epoxy resin.

16. The heat cured composition of claim 1.
17. The heat cured composition of claim 2.
18. The heat cured composition of claim 3.
19. The heat cured composition of claim 4.
20. The heat cured composition of claim 5.
21. The heat cured composition of claim 6.
22. The heat cured composition of claim 7.
23. The heat cured composition of claim 8.
24. The heat cured composition of claim 9.
25. The heat cured composition of claim 10.
26. The heat cured composition of claim 11.
27. The heat cured composition of claim 12.
28. The heat cured composition of claim 13.
29. The heat cured composition of claim 14.

* * * * *